(12) United States Patent
Chen et al.

(10) Patent No.: US 10,191,572 B2
(45) Date of Patent: Jan. 29, 2019

(54) DISPLAY MODULE AND DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Hongming Chen, Xiamen (CN); Shaoting Lin, Xiamen (CN); Yuping Ma, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 26 days.

(21) Appl. No.: 15/249,697

(22) Filed: Aug. 29, 2016

(65) Prior Publication Data
US 2016/0364056 A1 Dec. 15, 2016

(30) Foreign Application Priority Data
Jul. 8, 2016 (CN) .......................... 2016 1 0537399

(51) Int. Cl.
G02F 1/1333 (2006.01)
G06F 3/041 (2006.01)
G02F 1/1335 (2006.01)
G06F 3/044 (2006.01)

(52) U.S. Cl.
CPC ........ *G06F 3/0412* (2013.01); *G02F 1/13338* (2013.01); *G02F 1/133308* (2013.01); *G02F 1/133512* (2013.01); *G06F 3/044* (2013.01); *G06F 3/0414* (2013.01); *G02F 2001/133311* (2013.01); *G02F 2001/133314* (2013.01); *G06F 2203/04105* (2013.01)

(58) Field of Classification Search
CPC .................................................. G02F 1/133308
See application file for complete search history.

(56) References Cited

U.S. PATENT DOCUMENTS

2009/0079706 A1* 3/2009 Mishima ............. G02F 1/13338
345/173
2013/0154953 A1 6/2013 Lai et al.
(Continued)

FOREIGN PATENT DOCUMENTS

| CN | 101398555 A | 4/2009 |
|---|---|---|
| CN | 102549534 A | 7/2012 |
| CN | 103105982 A | 5/2013 |

(Continued)

*Primary Examiner* — Edmond C Lau
(74) *Attorney, Agent, or Firm* — Anova Law Group, PLLC (57) ABSTRACT

A display module and a display device are provided. The display module may comprise a first substrate; a second substrate disposed opposite to the first substrate; a backlight module disposed at a side of the first substrate facing away from the second substrate; a first electrode; a second electrode disposed opposite to the first electrode for force touch; an air-gap layer disposed between the first electrode and the second electrode, and disposed parallel to the first substrate; and a frame assembly having a receiving space for at least receiving the backlight module, wherein the frame assembly includes at least one through-hole interconnected to the air-gap layer.

21 Claims, 8 Drawing Sheets

(56) References Cited

U.S. PATENT DOCUMENTS

2016/0320548 A1* 11/2016 Oohira ................ G02B 6/0088
2017/0300146 A1* 10/2017 Han ....................... G06F 3/044

FOREIGN PATENT DOCUMENTS

| CN | 103672724 A | 3/2014 |
| CN | 104850267 A | 8/2015 |
| CN | 104980572 A | 10/2015 |
| CN | 105278792 A | 1/2016 |

* cited by examiner

FIG. 13

DISPLAY MODULE AND DISPLAY DEVICE

CROSS-REFERENCES TO RELATED APPLICATIONS

This application claims priority of Chinese Patent Application No. 201610537399.6, filed on Jul. 8, 2016, the entire contents of which are hereby incorporated by reference.

FIELD OF THE INVENTION

The present disclosure generally relates to the field of display technology and, more particularly, relates to a display module and a display device thereof.

BACKGROUND

A large variety of electronic devices adopt a display module integrated with a touch control element to receive user's input. When the user touches the display module by an external object, such as a finger, the display module sends a signal to the electronic device and, accordingly, a touch position is identified. In addition to detecting a touch position, emerging display modules are also able to detect a touch pressure, i.e., enable a force touch, which provides a specific action or contextually specific control based on the force applied by the external touch object and brings new dimensions to user interfaces and interactive computing.

Display modules often detect the magnitude of a touch pressure or a touch force based on capacitive pressure sensor technologies, i.e., detecting a touch force according to a capacitance change. However, due to an internal air gap formed between electrodes for sensing force touch in the display module, setting time and recovering time for a force signal is substantially long. Thus, the efficiency of the force touch may be low, and the user experience may be poor.

The disclosed display module and display device thereof are directed to solve one or more problems set forth above and other problems.

BRIEF SUMMARY OF THE DISCLOSURE

One aspect of the present disclosure provides a display module. The display module may comprise a first substrate; a second substrate disposed opposite to the first substrate; a backlight module disposed at a side of the first substrate facing away from the second substrate; a first electrode; a second electrode disposed opposite to the first electrode for force touch; an air-gap layer disposed between the first electrode and the second electrode, and disposed parallel to the first substrate; and a frame assembly having a receiving space for at least receiving the backlight module, wherein the frame assembly includes at least one through-hole interconnected to the air-gap layer.

Another aspect of the present disclosure provides a display device including the display module Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

Figure 1:
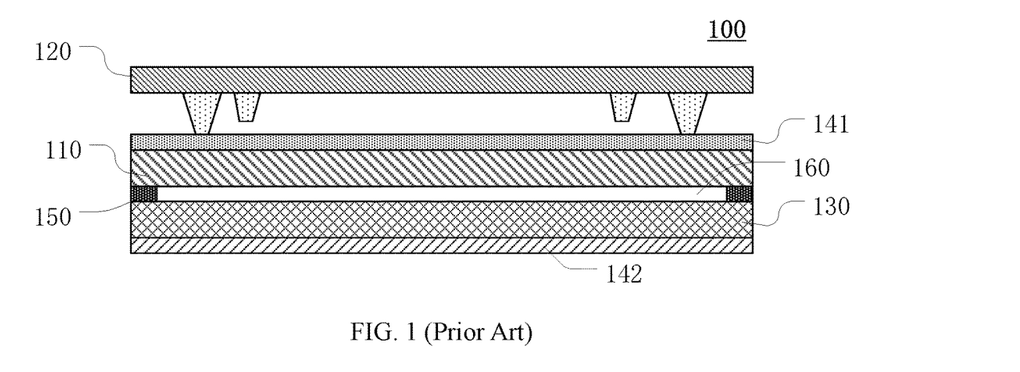
FIG. 1 illustrates a cross-sectional view of a current display module.

FIG. 1 illustrates a cross-sectional view of a current display module. As shown in FIG. 1, the display module 100 includes an array substrate 110, a color film substrate 120 arranged opposite to the array substrate 110, liquid crystal materials sandwiched between the array substrate 110 and the color film substrate 120, a backlight module 130 providing a backlight source, and a light-shielding layer 150. In particular, the light-shielding layer 150 is disposed between the array substrate 110 and the backlight module 130, attaching the backlight module 130 to the array substrate 110 and, meanwhile, preventing light leakage at the edges of the array substrate 110 caused by the backlight source in the backlight module 130.

The display module 100 further includes a first electrode 141 and a second electrode 142 for detecting a touch pressure or for force touch. The first electrode 141 is disposed on the array substrate 110 and the second electrode 142 is disposed beneath the backlight module 130. When the user' finger press the display module 110 at the color film substrate 120, the first electrode 141 and the second electrode 142 are deformed, e.g., the first electrode 141 bends towards the second electrode 142, the thickness of a gap 160 (i.e., an air gap) between the array substrate 110 and the backlight module 130 is reduced. Thus, a distance between the first electrode 141 and the second electrode 142 is reduced. The distance change between the first electrode 141 and the second electrode 142 leads to a capacitance change between the first electrode 141 and the second electrode 142 which, in turn, realizing a force touch.

Figure 2:
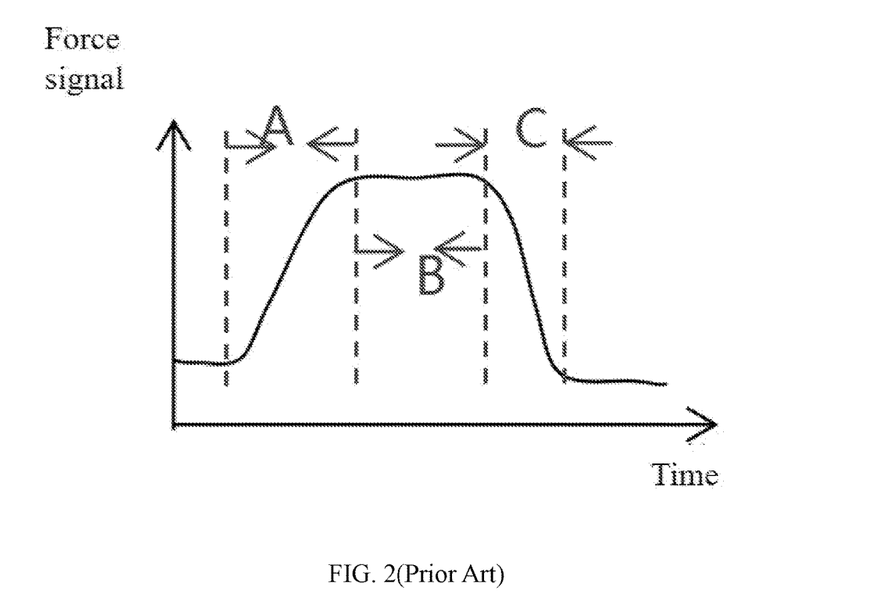
FIG. 2 illustrates a time dependent force signal in a current display module.

In the display module shown in FIG. 1, the light-shielding layer 150 forms a closed shape. FIG. 2 illustrates a time dependent force signal in a current display module. As shown in FIG. 2, the horizontal axis denotes time, and the vertical axis denotes magnitude of a force signal. The time period A denotes setting time for the force signal, the time period B denotes stabilization time for the force signal, and the time period C denotes relaxing or recovering time for the force signal.

The setting time for the force signal may refer to the time taken by the force signal to change from a specified low value to a specified high steady value, the recovering time for the force signal may refer to the time taken by the force signal to change from the specified high steady value to the specified low value, and the stabilization time for the force signal may refer to the time for keeping the specified high steady value.

Referring to FIG. 1, when a pressure is applied onto the display module 110, the light-shielding layer 150 seals the air in the gap 160 within the display module 110 and, thus, the air in the gap 160 cannot be vented out rapidly and effectively, and the setting time for the force signal is substantially long. On the other hand, when the pressure is removed, external air cannot flow into the gap 160 rapidly and, thus, the recovering time for the force signal is substantially long. For example, as shown in FIG. 2, the setting time for the force signal (i.e., the time period A) and the recovering time for the force signal (i.e., the time period C) of the display module 100 in FIG. 1 is approximately 5-10 seconds, respectively. Such a force touch may have a low detecting efficiency and poor user experience.

Figure 3:
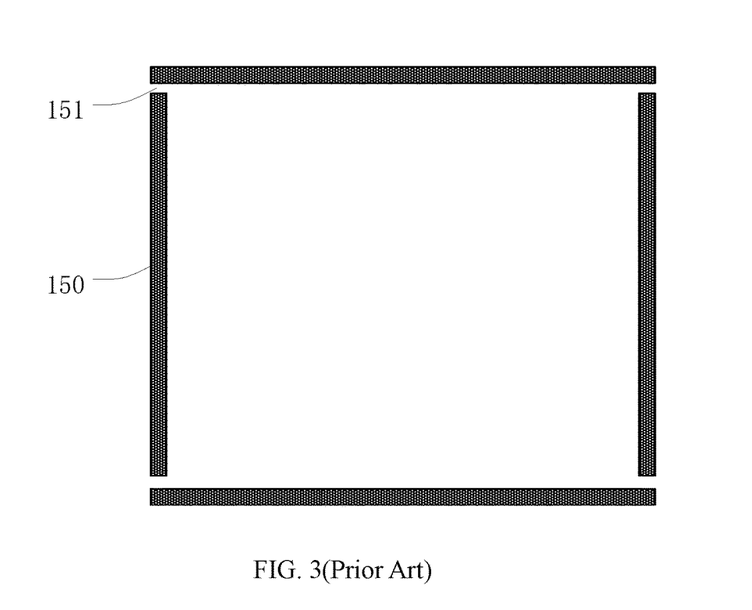
FIG. 3 illustrates a top view of a current light-shielding layer.

FIG. 3 illustrates a top view of a current light-shielding layer. The similarities between FIG. 3 and FIG. 1 are not repeated here, while certain differences may be explained. As shown in FIG. 3, a plurality of vent holes 151 are disposed in the light-shielding layer 150. The vent holes 151 disposed at the corner of the light-shielding layer 150 are able to improve the recovering speed of the gap 160 after the pressure is removed and the air exhausting speed in the gap 160 after the pressure is applied, such that the recovering time and setting time for the force signal is improved, respectively.

However, the vent holes 151 disposed in the light-shielding layer 150 may lead to a light leakage of the backlight module 130. For example, when watching the images displayed by the display module 100 at a large viewing angle, the user may observe the backlight source of the backlight module 130 at the vent holes 151, which may degrade the image performance of the display module 100.

Figure 4:
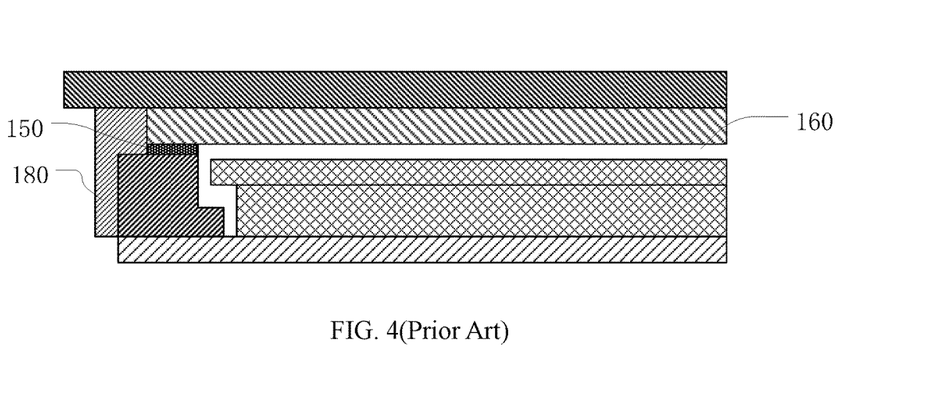
FIG. 4 illustrates a cross-sectional view of another current display module.

On the other hand, the current display modules are highly desired to have a narrow frame for space saving. FIG. 4 illustrates a cross-sectional view of another current display module. As shown in FIG. 4, when the display module 100 has a narrow frame, the width of the light-shielding layer 150 has to be reduced accordingly. Thus, fabricating and attaching the light-shielding layer 150 to the backlight module 130 may become more difficult. Sealing adhesive 180 may be required to seal the display module 100, however, the sealing adhesive 180 may affect the air exhausting in the gap 160.

The present disclosure provides an improved display module, which may be able to improve the efficiency of the force touch and, meanwhile, achieve a narrow frame. The display module may include a first substrate; a second substrate disposed opposite to the first substrate; a backlight module disposed at a side of the first substrate facing away from the second substrate; a first electrode; a second electrode disposed opposite to the first electrode for sensing force touch; an air-gap layer disposed between the first electrode and the second electrode and disposed parallel to the first substrate; and a frame assembly having a receiving space for receiving at least the backlight module. The frame may include at least one through-hole, and the at least one through-hole may be interconnected to the air-gap layer.

Figure 5:
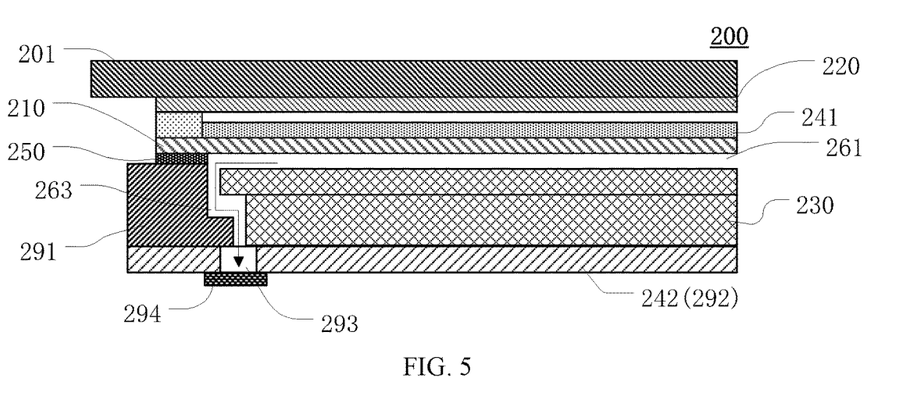
FIG. 5 illustrates a cross-sectional view of an exemplary display module consistent with disclosed embodiments.

FIG. 5 illustrates a cross-sectional view of an exemplary display module consistent with disclosed embodiments. As shown in FIG. 5, the display module 200 may include a first substrate 210, a second substrate 220, a backlight module 230, a first electrode 241, a second electrode 242, a gap layer 261, and a frame assembly having a side wall 291 and a bottom wall 292. In certain embodiments, the display module 200 may also include a cover plate 201 disposed on the second substrate 220.

The first substrate 210 may be an array substrate. For example, a plurality of thin film transistors (TFTs), a plurality of data lines, and a plurality of gate lines, and electrodes for display images (i.e., displaying electrodes) may be formed on the first substrate 210. The second substrate 220 may be a color film substrate. Display medium (not drawn in FIG. 5) may be sandwiched between the first substrate 210 and the second substrate 220. In one embodiment, the display medium may be liquid crystal material. In another embodiment, the display medium may be plasma display panel (PDP) display medium, field emission display (FED) display medium, organic light-emitting diode (OLED) display medium, light-emitting diode (LED) display medium, quantum dots (QDs) display medium, electrophoretic display medium or other appropriate display medium capable of displaying videos and/or images.

The backlight module 230 may be disposed at a side of the first substrate 210 facing away from the second substrate 220, and the backlight module 230 may be configured to provide a backlight source. The first electrode 241 may be disposed on the first substrate 210. In one embodiment, as shown in FIG. 5, the first electrode 241 may be disposed on a surface of the first substrate 210 facing away from the backlight module 230. In another embodiment, the first electrode 241 may be disposed on other appropriate film layers.

In one embodiment, the first electrode 241 may be multiplexed as a touch control electrode, for example, through a time-divisional driving method, which may detect a touch applied onto the display module 200 and a corresponding touch position based on self-capacitance or mutual-capacitance. In another embodiment, the first electrode 241 may be further multiplexed as electrodes for force touch, touch controlling and display, for example, through a time-divisional driving method.

The second electrode 242 may be disposed opposite to the first electrode 241, both of which may detect a touch pressure or realize a force touch. The second electrode 242 may be disposed beneath the backlight module 230, i.e., disposed at a side of the backlight module 230 facing away from the first electrode 241. The gap layer 261 may be filled with air and, thus, is also called as an air-gap layer 261. The air-gap layer 261 may be provided between the first electrode 241 and the second electrode 242. When a pressure or a force is applied onto the display module 200, the thickness of the air-gap layer 261 may be changed which, in turn, may change the capacitance between the first electrode 241 and the second electrode 242. Thus, the magnitude of force or the pressure may be determined according to a capacitance change between the first electrode 241 and the second electrode 242.

In one embodiment, as shown in FIG. 5, the air-gap layer 261 may be a first air-gap layer 261 disposed between the first substrate 210 and backlight module 230. In another embodiment, the air-gap layer 261 may be disposed on other film layers, depending on the positions of the first electrode 241 and the second electrode 242, as well as, the structure of the display module 200.

The frame assembly may have a receiving space for receiving at least the backlight module 230. To rapidly vent out the air from the first air-gap layer 261 when a pressure is applied onto the display module 200 and restore the air in the first air-gap layer 261 when the pressure is removed, the frame assembly may include at least one through-hole 293, which may be interconnected to the first air-gap layer 261. The frame assembly may include the bottom wall 292 and the side wall 291. The bottom wall 292 may be made of iron, for example, an iron frame. Other materials may also be used to form the bottom wall 292

In one embodiment, as shown in FIG. 5, the bottom wall 292 may be multiplexed as the second electrode 242. The second electrode 242 may be connected to ground and used as a reference electrode in the force touch. In another embodiment, the second electrode 242 may be disposed between the bottom wall 292 and the backlight module 230. The backlight module 230 may be fixed onto the bottom wall 292 through an adhesive layer.

The side wall 291 and the bottom wall 292 may be connected to each other to form the receiving space for the backlight module 230. A channel 263, which may interconnect the air-gap layer (e.g., the first air-gap layer 261 in FIG. 5) and the through-hole 293, may be disposed between the side wall 291 and the backlight module 230. The side wall 291 may at least include an adhesive frame. In one embodiment, as shown in FIG. 5, the side wall 291 may only include an adhesive frame. In another embodiment, the side wall 291 may include an adhesive frame and other appropriate frames, for example, an iron frame.

In the disclosed embodiments, the side wall 291 and the bottom wall 292 may not be walls of the frame assembly. Instead, the side wall 291 and the bottom wall 292 may be members or elements which form the frame assembly. That is, each of the side wall 291 and the bottom wall 292 may have its own length, width, height and a corresponding three-dimensional shape, which are not explained here. In one embodiment, the side wall 291 and the bottom wall 292 may be individually formed, then assembled to form the frame assembly. In another embodiment, the side wall 291 and the bottom wall 292 may be integrally formed.

Further, the bottom wall 292 may be multiplexed as the second electrode 242, and the through-hole 293 may be disposed in the bottom wall 292. The channel 263, which may interconnect the air-gap layer (e.g., the first air-gap layer 261 in FIG. 5) and the through-hole 293, may have an extending direction (denoted by the arrow in FIG. 5) perpendicular to the air-gap layer (e.g., the first air-gap layer 261 in FIG. 5). It should be noted that, the extending direction of the channel 263 (denoted by the arrow in FIG. 5) only illustrates an interconnecting direction between the air-gap layer (e.g., the first air-gap layer 261 in FIG. 5) and the through-hole 293, which is not intended to limit the shape of the channel 263.

Through disposing the at least one through-hole 293 in the bottom wall 292, the efficiency of detecting touch pressure, i.e., the efficiency of force touch, may be improved. In particular, when an external pressure is applied onto the display module 200, air may be rapidly vented out from the first air-gap layer 261 through the through-hole 293, such that the space or the distance between the first electrode 241 and the second electrode 242 may be rapidly changed according to the applied pressure, and a corresponding force signal may be rapidly obtained accordingly. That is, when an external pressure is applied onto the display module 200, the setting time for the force signal may be reduced.

When the external pressure is removed from the display module 200, air may be rapidly restored to the first air-gap layer 261 through the through-hole 293, and the space or the distance between the first electrode 241 and the second electrode 242 may be rapidly returned to a state without the external pressure. That is, when the external pressure is removed from the display module 200, the recovering time for the force signal may be reduced.

Further, the through-hole 293 may have two ends. One end of the through-hole 293 may be interconnected to the air-gap layer (e.g., the first air-gap layer 261 in FIG. 5), and the other end of the through-hole 293 may be provided with a dust screen 294. The dust screen 294 may be a dark foam, which may prevent dust or moisture from entering the through-hole 293 and from affecting internal components of the display module 200.

In certain embodiments, the display module 200 may also include a light-shielding layer 250, which may be disposed between the first substrate 210 and the backlight module 230, and disposed on the edges of the backlight module 230. The light-shielding layer 250 may attach the backlight module 230 to the first substrate 210. In one embodiment, as shown in FIG. 5, the light-shielding layer 250 may not be provided with any through-holes interconnecting to the air-gap layer (e.g., the first air-gap layer 261 in FIG. 5). Thus, on one hand, the air in the air-gap layer may be rapidly vented out and restored, on the other hand, backlight leakage in the display module 200 may be suppressed.

In another embodiment, while ensuring no light leakage occurs, the light-shielding layer 250 may be provided with at least one vent hole interconnected to the air-gap layer 261 (not shown in FIG. 5). The vent hole provided in the light-shielding layer 250 may also help the air to rapidly vent out from and restore to the air-gap layer.

Compared to current display modules, the disclosed display module 200 may have the through-hole 293 disposed in the frame assembly, for example, in the bottom wall 292. Thus, when the display module 200 has a narrow frame and sealing adhesive is applied onto the light-shielding layer 250 to seal the display module 200, the sealing adhesive may not seal (or close) the channel 263 interconnecting the air-gap layer 261 and the through-hole 293. That is, the disclosed display module 200 may be able to improve the efficiency of force touch and, meanwhile, achieve a narrow frame.

Figure 6:
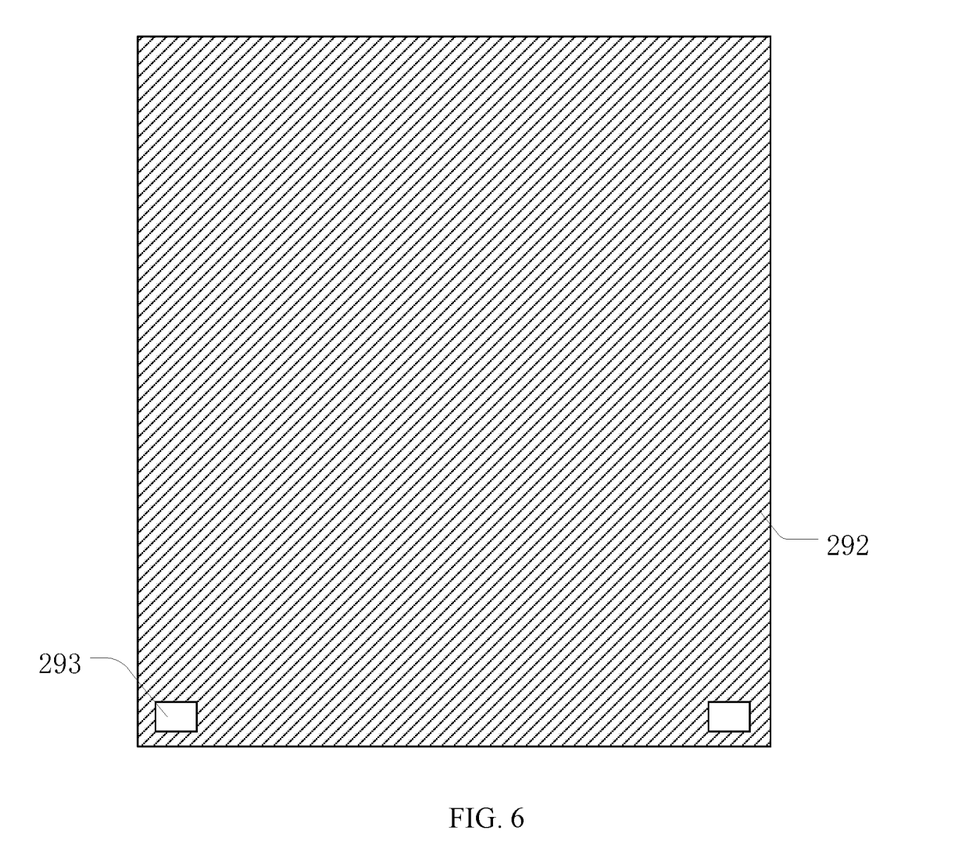
FIG. 6 illustrates a top view of an exemplary bottom wall in an exemplary display module in FIG. 5 consistent with disclosed embodiments.

FIG. 6 illustrates a top view of an exemplary bottom wall in an exemplary display module in FIG. 5 consistent with disclosed embodiments. As shown in FIG. 6, the bottom wall 292 may have the same shape as the display module, for example, the bottom wall 292 may have a polygonal shape, and the through-holes 293 may be disposed in or close to the corners of the polygonal shape (i.e., the corners of the display module). In one embodiment, as shown in FIG. 6, the bottom wall 292 may have a rectangular shape, and two through-holes 293 may be disposed in two corners of the bottom wall 292, respectively. The through-holes 293 may have a rectangular opening, i.e., the through-holes 293 may have a rectangular shape. In another embodiment, four through-holes 293 may be disposed in four corners of the bottom wall 292, respectively.

The shape of the bottom wall 292, as well as, the number and the shape of the through-holes 293 in FIG. 6, are only for illustrative purposes and are not intended to limit the scope of the present disclosure. In certain embodiments, the through-holes 293 may have different shapes according to various applications and fabrication process, for example, a quadrilateral, a circular, a triangular or a diamond shape.

Figure 7:
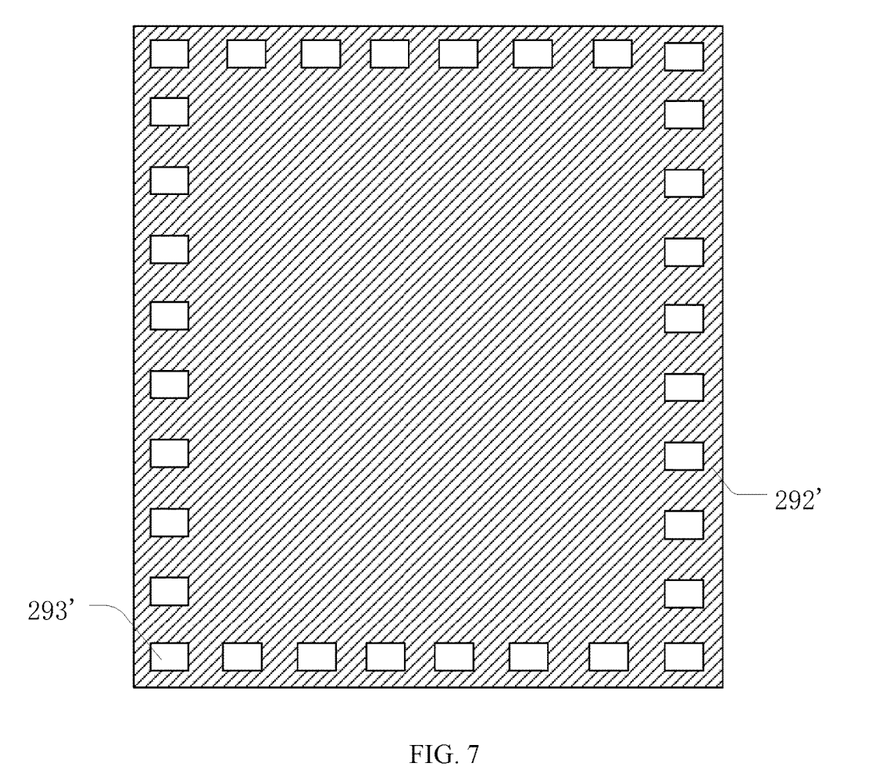
FIG. 7 illustrates a top view of another exemplary bottom wall in an exemplary display module in FIG. 5 consistent with disclosed embodiments.

FIG. 7 illustrates a top view of another exemplary bottom wall in an exemplary display module in FIG. 5 consistent with disclosed embodiments. The similarities between FIG. 6 and FIG. 7 are not repeated here, while certain differences may be explained. As shown in FIG. 7, a plurality of through-holes 293' may be disposed close to the edges of a bottom wall 292'. That is, the through-holes 293' may be disposed close to the edges of the display module. In one embodiment, as shown in FIG. 7, the bottom wall 292' may have a rectangular shape, and the through holes 293' may be disposed close to four sides of the bottom wall 292', respectively. The number of the through-holes 293' in FIG. 7 are only for illustrative purposes and are not intended to limit the scope of the present disclosure.

In another embodiment, the bottom wall 292' may have a rectangular shape, and the through-holes 293' may be disposed close to one side, two sides or three sides of the bottom wall 292'. In another embodiment, the bottom wall 292' may have a same polygonal shape as the display module, and the through-holes 293' may be disposed close to at least one side of the bottom wall 292'.

It should be noted that, the shape of the bottom wall, the arrangement, the number, the shape, and the position of the through-holes in FIGS. 6-7 are only for illustrative purposes and are not intended to limit the scope of the present disclosure.

Figure 8:
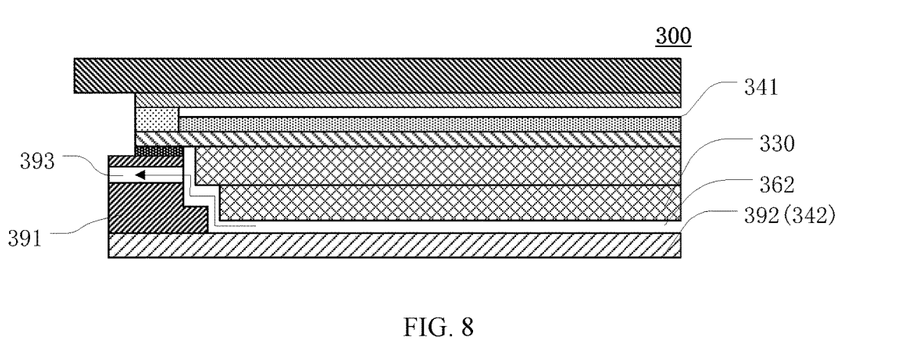
FIG. 8 illustrates a cross-sectional view of another exemplary display module consistent with disclosed embodiments.

FIG. 8 illustrates a cross-sectional view of another exemplary display module consistent with disclosed embodiments. The similarities between FIG. 5 and FIG. 8 are not repeated here, while certain differences may be explained. As shown in FIG. 8, the display module 300 may include an air-gap layer 362, disposed between a backlight module 330 and a bottom wall 392. The air-gap layer 362 may be a second air-gap layer 362, which may be formed by an adhesive frame of a side wall 391 or adding a support on a bottom wall 392. At least one through-hole 393 interconnected to the air-gap layer (e.g., the second air-gap layer 362 in FIG. 8) may be provided in the side wall 391.

A channel, which may interconnect the air-gap layer (e.g., the second air-gap layer 362 in FIG. 8) and the through-hole 393, may have an extending direction (denoted by the arrow in FIG. 8) parallel to the air-gap layer (e.g., the second air-gap layer 362 in FIG. 8). That is, the through-hole 393 may be disposed at a side of the second air-gap layer 362 (e.g., left side of the second air-gap layer 362 in FIG. 8), such that the air may be vented out from or restored to the second air-gap layer 362 in a direction approximately parallel to the second air-gap layer 362.

Further, the display module 300 may also include a first electrode 341 and a second electrode 342, and the second electrode 342 may be multiplexed as the bottom wall 392. The second air-gap layer 362 may be disposed between the first electrode 341 and the second electrode 342. Thus, the display module 300 may detect the force applied onto the display module 300 according to a deformation of the second air-gap layer 362.

When an external pressure is applied onto the display module 300, air may be rapidly vented out from the second air-gap layer 362 through the through-hole 393 provided in the side wall 391. When the external pressure is removed from the display module 300, air may be rapidly restored to the second air-gap layer 362 through the through-hole 393 provided in the side wall 391. Thus, the efficiency of the force touch may be improved, and user experience of the force touch may be enhanced.

Further, one end of the through-hole 393, for example, the end of the through-holes exposed to the outside environment, may be provided with a dust screen. The arrangement of the through-holes 393 in the side wall 391 may be similar to the arrangement of the through-holes 293 in FIGS. 6-7. In one embedment, the through-holes 393 may be disposed in the side wall 391, corresponding to the corners of the polygonal display module 300, i.e., the through-holes 393 may be disposed in the corners of the side wall 391. In another embodiment, the through-holes 393 may be disposed in the side wall 391, corresponding to least one side the polygonal display module 300, i.e., the through-holes 393 may be disposed close to at least one side of the side wall 391.

In the display module 300 shown in FIG. 8, the through-holes 393 may be provided in the side wall 391. In certain embodiments, the through-holes 393 may be provided in the bottom wall 392. In certain other embodiments, the through-holes 393 may be provided in both the bottom wall 392 and the side wall 391. The end of the through-hole 393 exposed to the external environment may be provided with a dust screen, thus, dust and oxygen may be prevented from entering the display module 300.

Figure 9:
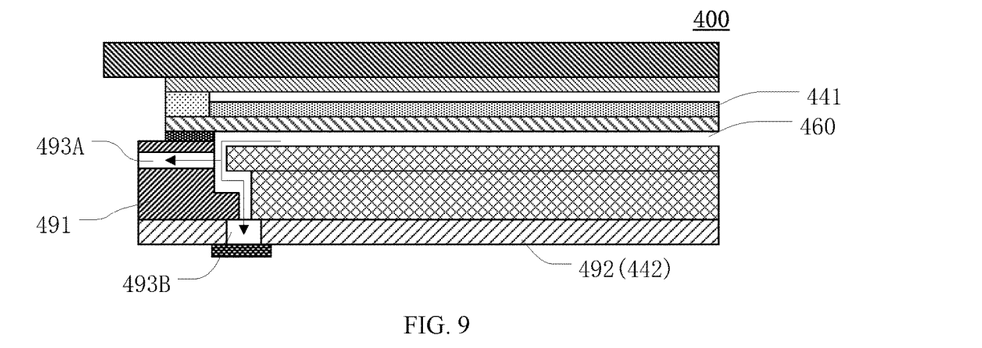
FIG. 9 illustrates a cross-sectional view of another exemplary display module consistent with disclosed embodiments.

FIG. 9 illustrates a cross-sectional view of another exemplary display module consistent with disclosed embodiments. The similarities between FIG. 5 and FIG. 9 are not repeated here, while certain differences may be explained. As shown in FIG. 9, the display module 400 may include at least one through-hole 493A provided in a side wall 491, and at least one through-hole 493B provided in a bottom wall 492. Thus, air in an air-gap layer 460 may be vented out or restored through both the through-hole 493A and the through-hole 493B. That is, air in an air-gap layer 460 may be vented out or restored in two directions, i.e., in a direction approximately parallel to the air-gap layer 460 and in a direction approximately perpendicular to the air-gap layer 460.

Further, the display module 400 may also include a first electrode 441 and a second electrode 442, and the second electrode 442 may be multiplexed as the bottom wall 492. The air-gap layer 460 may be disposed between the first electrode 441 and the second electrode 442. Thus, the display module 400 may detect the force applied onto the display module 400 according to a deformation of the air-gap layer 460.

For example, when an external pressure is applied onto the display module 400, air may be more rapidly vented out from the air-gap layer 460 via the through-hole 493A provided in the side wall 491 and the through-hole 493B provided in the bottom wall 492. When the external pressure is removed from the display module 400, air may be more rapidly restored to the air-gap layer 460 via the through-hole 493A provided in the side wall 491 and the through-hole 493B provided in the bottom wall 492. Thus, the efficiency of the force touch may be further improved, and the user experience of the force touch may be further enhanced.

In one embodiment, the positions of the through-hole 493A provided in the side wall 491 may correspond to the positions of the through-hole 493B provided in the bottom wall 492. For example, the through-hole 493A and the through-hole 493B may be disposed corresponding to the corners of the polygonal display module 400. That is, the through-holes 493A may be disposed in the corners of the side wall 491, and the through-hole 493B may be disposed in the corners of the bottom wall 492.

In another embodiment, the positions of the through-hole 493A provided in the side wall 491 may not correspond to the positions of the through-hole 493B provided in the bottom wall 492. For example, the through-hole 493A may be disposed corresponding to the corners of the polygonal display module 400, while the through-hole 493B may be disposed corresponding to at least one side of the polygonal display module 400.

Figure 10:
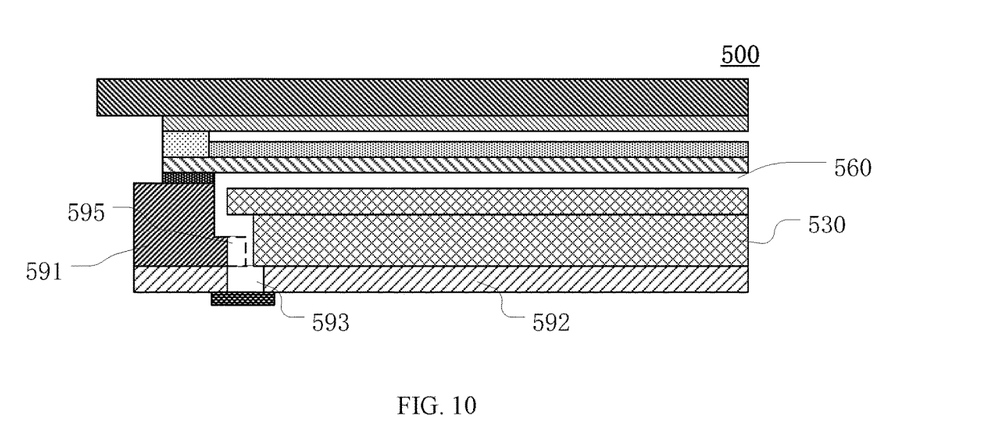
FIG. 10 illustrates a cross-sectional view of another exemplary display module consistent with disclosed embodiments.

FIG. 10 illustrates a cross-sectional view of another exemplary display module consistent with disclosed embodiments. The similarities between FIG. 5 and FIG. 10 are not repeated here, while certain differences may be explained. As shown in FIG. 10, compared to the display module 200 in FIG. 5, the display module 500 may further include a groove 595 provided in a side wall 591. The groove 595 may be formed by excavating an overlapped area between a stepped zone of the side wall 591 and a through-hole 593 provided in a bottom wall 592. Thus, the through-hole 593 provided in the bottom wall 592 may be less overlapped with the side wall 591, reducing the barrier and facilitating the air venting and restoring in an air-gap layer 560.

That is, the through-hole 593 provided in the bottom wall 592 may be partially overlapped with the side wall 591 (e.g., adhesive frame). The groove 595 may be formed in the overlapped area between the side wall 591 and the through-hole 593, and may be interconnected to the through-hole 593. The groove 595 may be able to speed the air venting and restoring in the air-gap layer 560, i.e., the air flow in the through-hole 593 may be no longer confined by the side wall 592, and the air may be easier to pass through the through-hole 593.

Figure 11:
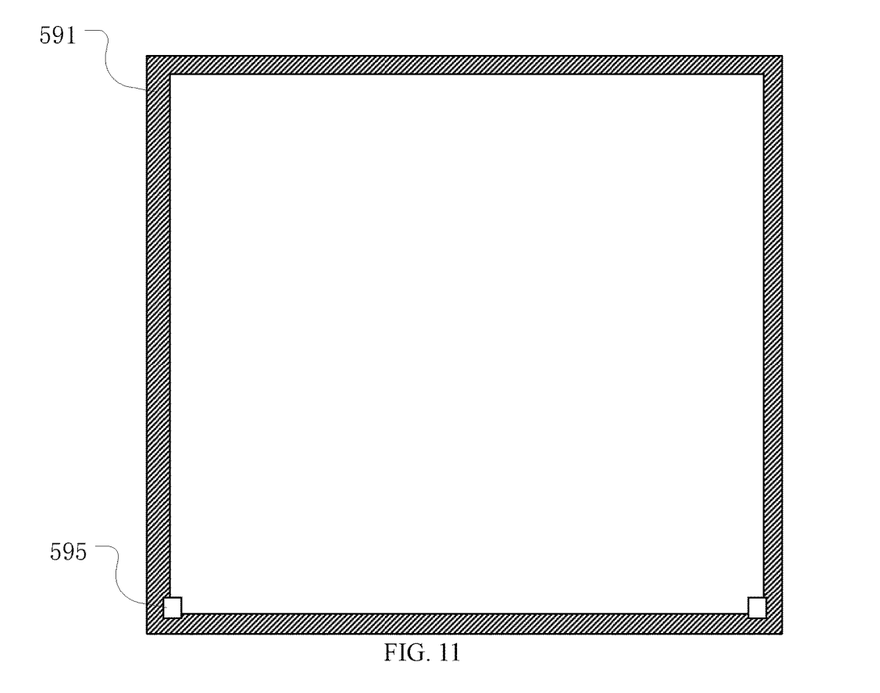
FIG. 11 illustrates a top view of an exemplary side wall in another exemplary display module in FIG. 10 consistent with disclosed embodiments.

FIG. 11 illustrates a top view of an exemplary side wall in another exemplary display module in FIG. 10 consistent with disclosed embodiments. The arrangement of the through-holes 593 in the display module 500 in FIG. 11 may be similar to the arrangement of the through-holes 293 in the display module 200 in FIG. 6. That is, the through-holes 593 may be disposed in the bottom wall 592, corresponding to the corners of the display module 500. The groove 595 may be disposed in the overlapped area between the side wall 591 and the through-hole (i.e., through-holes 593 in FIG. 10). That is, the grooves 595 may be disposed close to the corners of the display module 500.

The number and the shape of the grooves 595 in FIG. 11 is only for illustrative purposes and is not intended to limit the scope of the present disclosure. In one embodiment, the grooves 595 may be one-to-one corresponding to the through-holes 593. In another embodiment, the grooves 595 may be no longer one-to-one corresponding to the through-holes 593. For example, only one or some through-holes 593 may have the corresponding grooves 595.

Figure 12:
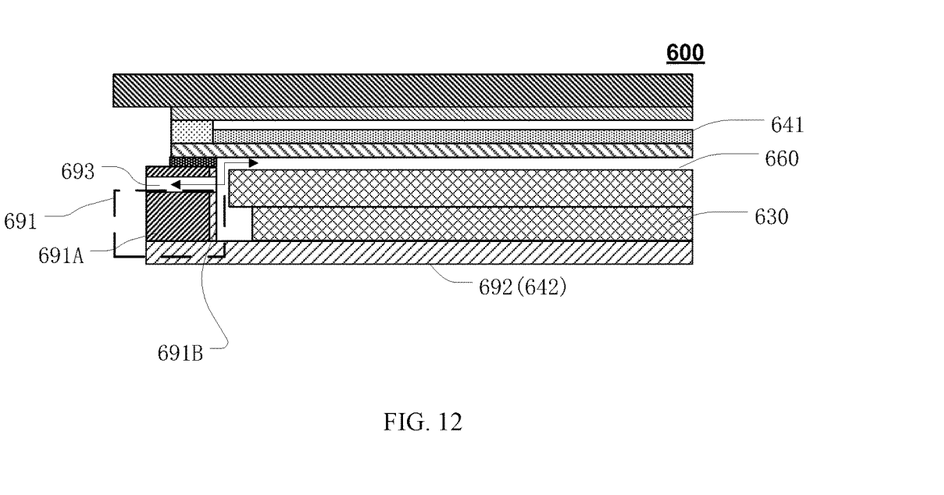
FIG. 12 illustrates a cross-sectional view of another exemplary display module consistent with disclosed embodiments.

FIG. 12 illustrates a cross-sectional view of another exemplary display module consistent with disclosed embodiments. The similarities between FIG. 5 and FIG. 12 are not repeated here, while certain differences may be explained. As shown in FIG. 12, compared to the display module 200 in FIG. 5, a side wall 691 in the display module 600 may include an adhesive frame 691A and an iron frame 691B. The iron frame 691B may be disposed close to a backlight module 630, and the adhesive frame 691A may be disposed surrounding the iron frame 691B. At last one through-hole 693 may be provided in the side wall 691. That is, the through-hole 693 may be interconnected to an air-gap layer 660 through penetrating the adhesive frame 691A and the iron frame 691B.

Further, the display module 600 may include a first electrode 641 and a second electrode 642, and the second electrode 642 may be multiplexed as a bottom wall 692. The air-gap layer 660 may be disposed between the first electrode 641 and the second electrode 642. Thus, the display module 600 may detect the force applied onto the display module 600 according to a deformation of the air-gap layer 660. The through-hole 693 provided in the side wall 691 may help the air to rapidly vent out from the air-gap layer when an external pressure is applied onto the display module 600, and help the air to restore to the air-gap layer when the external pressure is removed from the display module 600. Accordingly, the efficiency of force touch may be improved, and the user experience may be enhanced.

FIGS. 5-12 merely show a partial structure of the disclosed display modules for illustrative purposes, in which certain components may be omitted and structure of various film layers may be simplified. Various modifications to these embodiments will be generated by those skilled in the art, for example, by adding certain other components and/or modifying the shape of the components. As long as the generic principles defined herein is applied to other embodiments without departing from the spirit or scope of the invention, various modifications to these embodiments are all falling within the scope of the present invention.

Figure 13:
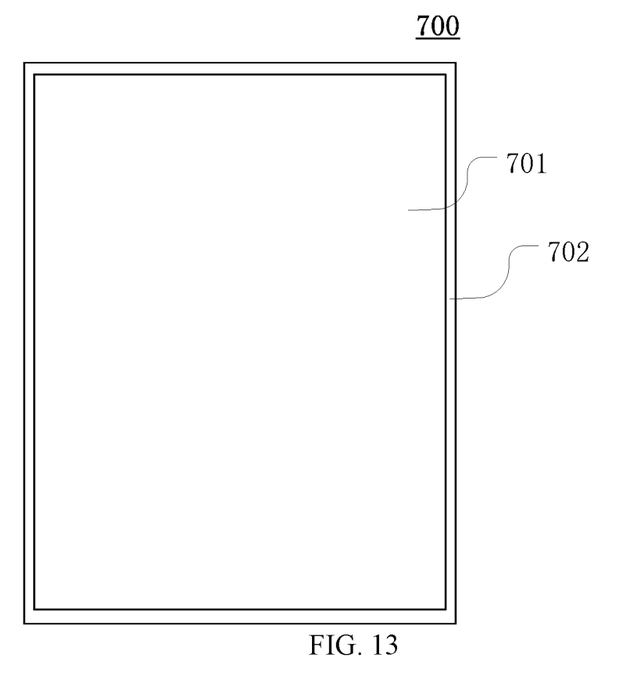
FIG. 13 illustrates a top view of an exemplary display device consistent with disclosed embodiments.

The present disclosure further provides a display device including any of the disclosed display modules. FIG. 13 illustrates an exemplary display device consistent with disclosed embodiments. The display device 700 may include any of the disclosed display modules. The display device 700 may be a smart wearable device, a tablet, a TV, a smartphone, a notebook, and, a digital frame, etc. Further, the display device 700 may be any appropriate type of content-presentation devices.

As shown in FIG. 13, the display device 700 may include a display area 701 and a non-display area 702 surrounding the display area 701. The disclosed display module may enable the display area 701 to display images. Because the disclosed display module may realize a force touch, the display device 700 may also be called as a touch display device 700. The touch display device 700 may have an integrated processor to control and process the images displayed on the touch display device 700, which is not explained here. The processor and other components may be disposed in the non-display area 702, or other regions of the touch display device 700 which are not used for displaying.

In the disclosed embodiments, at least one through-hole may be provided in the frame assembly to improve the air venting speed and the air restoring speed in the air-gap layer which, in turn, may improve the efficiency of the force touch. The through-holes may be disposed in at least one of the side wall and the bottom wall of the frame assembly. The through-holes provided in the frame assembly may not result a light leakage of the backlight module, thus, the image performance of the display module may not be degraded. Further, the through-holes provided in the frame assembly may also reduce the weight of the display module, and a lighter display module may be obtained.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display module, comprising:
   a first substrate;
   a second substrate disposed opposite to the first substrate;
   a backlight module disposed at a side of the first substrate facing away from the second substrate;
   a first electrode;
   a second electrode disposed opposite to the first electrode for force touch;
   an air-gap layer disposed between the first electrode and the second electrode, and disposed parallel to the first substrate; and
   a frame assembly having a receiving space for at least receiving the backlight module, wherein the frame assembly includes at least one through-hole interconnected to the air-gap layer,
   wherein the frame assembly further includes:
   a bottom wall; and
   a side wall connected to the bottom wall to form the receiving space, wherein a channel interconnecting the air-gap layer and the at least one through-hole is disposed between the side wall and the backlight module.

2. The display module according to claim 1, wherein:
   the bottom wall of the frame assembly is multiplex as the second electrode.

3. The display module according to claim 1, wherein:
   the at least one through-hole is provided in the bottom wall of the frame assembly; and
   an extending direction of the channel interconnecting the air-gap layer and the at least one through-hole is perpendicular to the air-gap layer.

4. The display module according to claim 3, wherein:
   the at least one through-hole provided in the bottom wall is partially overlapped with the side wall; and
   a groove interconnected to the at least one through-hole is disposed in an overlapped area of the at least one through-hole and the side wall.

5. The display module according to claim 1, wherein:
   the at least one through-hole is provided in the side wall of the frame assembly; and
   an extending direction of the channel interconnecting the air-gap layer and the at least one through-hole is parallel to the air-gap layer.

6. The display module according to claim 3, wherein:
   the frame assembly further includes a first through-hole provided in the side wall of the frame assembly, and an extending direction of the channel interconnecting the air-gap layer and the first through-hole is parallel to the air-gap layer.

7. The display module according to claim 1, wherein:
   the bottom wall is an iron frame; and
   the side wall includes at least an adhesive frame.

8. The display module according to claim 1, wherein the air-gap layer is:
   a first air-gap layer disposed between the first substrate and the backlight module.

9. The display module according to claim 1, wherein:
   the at least one through-hole has a first end and a second end;
   the first end of the at least one through-hole is interconnected to the air-gap layer; and
   the second end of the at least one through-hole is provided with a dust screen.

10. The display module according to claim 1, wherein:
    the display module has a polygonal shape; and
    the at least one through-hole is disposed close to corners of the display module.

11. The display module according to claim 1, wherein:
    the display module includes a plurality of through-holes; and
    the through-holes are disposed close to at least one side of the display module.

12. The display module according to claim 1, wherein:
    the at least one through-hole has a quadrilateral shape, a circular shape, a triangular shape or a diamond shape.

13. The display module according to claim 1, further including:
    a light-shielding layer disposed between the first substrate and the backlight module, disposed on edges of the backlight module, and configured to attach the backlight module to the first substrate.

14. The display module according to claim 13, wherein:
    the light-shielding layer includes at least one vent hole interconnected to the air-gap layer.

15. The display module according to claim 1, wherein:
    the first electrode is multiplexed as a touch control electrode.

16. The display module according to claim 1, wherein:
    the first substrate has a first side facing the backlight module and an opposite second side facing away from the backlight module; and
    the first electrode is disposed at the second side of the first substrate.

17. The display module according to claim 1, further including:
    liquid crystal materials sandwiched between the first substrate and the second substrate, wherein the first substrate is an array substrate, and the second substrate is a color film substrate.

18. The display module according to claim 9, wherein:
    the dust screen is a dark foam.

19. The display module according to claim 1, wherein the air-gap layer is:
    a second air-gap layer disposed between the frame assembly and the backlight module.

20. A display module, comprising:
    a first substrate;
    a second substrate disposed opposite to the first substrate;
    a backlight module disposed at a side of the first substrate facing away from the second substrate;
    a first electrode disposed on the first substrate;
    a second electrode disposed opposite to the first electrode for force touch;
    an air-gap layer disposed between the first electrode and the second electrode, and disposed parallel to the first substrate; and a frame assembly, including a bottom wall and a side wall connected to the bottom wall in a manner providing a receiving space for at least receiving the backlight module, wherein the frame assembly includes a first through-hole in the bottom wall and a second through-hole in the side wall connecting to the first through-hole, the first and second through-holes being interconnected to the air-gap layer, and the first substrate is an array substrate, and the second substrate is a color film substrate.

21. A display device comprising a display module, wherein the display module comprises:

a first substrate;

a second substrate disposed opposite to the first substrate;

a backlight module disposed at a side of the first substrate facing away from the second substrate;

a first electrode;

a second electrode disposed opposite to the first electrode for force touch;

an air-gap layer disposed between the first electrode and the second electrode, and disposed parallel to the first substrate; and a frame assembly having a receiving space for at least receiving the backlight module, wherein the frame assembly includes at least one through-hole interconnected to the air-gap layer, wherein the frame assembly further includes:

a bottom wall, and a side wall connected to the bottom wall to form the receiving space, wherein a channel interconnecting the air-gap layer and the at least one through-hole is disposed between the side wall and the backlight module.

* * * * *